US011853751B2

(12) United States Patent
Wu et al.

(10) Patent No.: US 11,853,751 B2
(45) Date of Patent: Dec. 26, 2023

(54) INDIRECT FUNCTION CALL TARGET IDENTIFICATION IN SOFTWARE

(71) Applicant: International Business Machines Corporation, Armonk, NY (US)

(72) Inventors: Qiushi Wu, Minneapolis, MN (US); Zhongshu Gu, Ridgewood, NJ (US); Hani Talal Jamjoom, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 17/644,021

(22) Filed: Dec. 13, 2021

(65) Prior Publication Data

US 2023/0185568 A1 Jun. 15, 2023

(51) Int. Cl.
*G06F 9/44* (2018.01)
*G06F 8/75* (2018.01)
*G06N 3/08* (2023.01)

(52) U.S. Cl.
CPC ........ *G06F 8/75* (2013.01); *G06N 3/08* (2013.01)

(58) Field of Classification Search
CPC .................................. G06F 8/75; G06N 3/08
USPC ................................................. 717/120–123
See application file for complete search history.

(56) References Cited

U.S. PATENT DOCUMENTS 9,639,365 B2 * 5/2017 Coon .................... G06F 9/3851
9,767,004 B2    9/2017 Yang et al.
9,996,696 B2    6/2018 Baji-Gál
10,055,592 B2   8/2018 Baji-Gál
10,572,375 B1   2/2020 Wagner
10,902,121 B2   1/2021 Chari et al.
10,915,631 B2 * 2/2021 Chen .................... G06F 21/566
2006/0225056 A1 10/2006 Mukkavilli
2013/0227693 A1  8/2013 Dewey
2014/0019949 A1  1/2014 Craymer
2015/0363198 A1 12/2015 Yang et al.
2015/0370556 A1 * 12/2015 Strosaker ................. G06F 8/75
                                                            717/123

FOREIGN PATENT DOCUMENTS

WO WO-2018038993 A1 * 3/2018 .......... G06F 11/3604

OTHER PUBLICATIONS

Pawlowski et al., "VPS: Excavating High-Level C++ Constructs from Low-Level Binaries to Protect Dynamic Dispatching", 2019, ACM, pp. 97-112. (Year: 2019).*
Garza et al., "Bit-level Perceptron Prediction for Indirect Branches", 2019, ACM, pp. 27-38. (Year: 2019).*

(Continued)

*Primary Examiner* — Ted T. Vo
(74) *Attorney, Agent, or Firm* — Yee & Associates, P.C.

(57) ABSTRACT

Indirect function call target identification in software is provided. A set of explicit data flows that pass a function address between software modules of a program is determined using an explicit data dependency analysis. A set of indirect function call targets is generated from results of the explicit data dependency analysis and a dynamic execution analysis of the program. The set of indirect function call targets is expanded by identifying similar target functions based on feature embeddings generated by a graph neural network.

20 Claims, 6 Drawing Sheets

(56) References Cited

OTHER PUBLICATIONS

Kim et al., "Refining Indirect Call Targets at the Binary Level," Network and Distributed Systems Security (NDSS 2021) Symposium, Feb. 21-25, 2021, 18 pages.

Lu et al., "Where Does It Go? Refining Indirect-Call Targets with Multi-Layer Type Analysis," The 26th ACM Conference on Computer and Communications Security (CCS '19), Nov. 11-15, 2019, London, United Kingdom, 16 pages.

Cox et al., "Proceedings Of Rebnita 2005, 1st International Workshop on Requirements Engineering for Business Need and IT Alignment," Aug. 29-30, 2005, Paris, France, 174 pages.

Dugerdil et al., "Applying Financial Time Series Analysis To The Dynamic Analysis Of Software," 4th International Conference on Software and Data Technologies (ICSOFT), Sofia, Bulgaria, Jul. 2009, pp. 194-201.

Anonymous, "An automated discovery and tracking of the Business Application structure," An IP.com Prior Art Database Technical Disclosure, IPCOM000227782D, May 16, 2013, 8 pages.

Anonymous, "Method of finding implicit interdependencies across methods and files in a software configuration management system," An IP.com Prior Art Database Technical Disclosure, IPCOM000241515D, May 8, 2015, 6 pages.

Anonymous, "Method and System for Automatic Log Discovery, Identification, Collection and Parsing," An IP.com Prior Art Database Technical Disclosure, IPCOM000250171D, Jun. 7, 2017, 5 pages.

Sarkar et al., "Discovery of Architectural Layers and Measurement of Layering Violations in Source Code," Journal of Systems and Software, Jun. 24, 2009, 39 pages.

9 SOMMERVILLE, "Software Engineering 6th Edition," copyright 2001, Addison-Wesley, 1373 pages.

PCT International Search Report and Written Opinion, dated Jan. 12, 2023, regarding Application No. PCT/CN2022/129504, 9 pages.

* cited by examiner

INDIRECT FUNCTION CALL TARGET IDENTIFICATION IN SOFTWARE

BACKGROUND

1. Field

The disclosure relates generally to function calls and more specifically to identifying indirect function call targets in source code of software.

2. Description of the Related Art

A function call is a call that passes control of a program to a subroutine. After the subroutine is executed, control returns to the next instruction in the program. A function call is formed by an expression that evaluates to a function followed by the function-call operator. The arguments to the function-call operator come from a comma-separated list of expressions. The values of these expressions are passed to the function as arguments. Whenever a function call is encountered, the program control is transferred to that called function.

SUMMARY

According to one illustrative embodiment, a computer-implemented method for indirect function call target identification in software is provided. A set of explicit data flows that pass a function address between software modules of a program is determined using an explicit data dependency analysis. A set of indirect function call targets is generated from results of the explicit data dependency analysis and dynamic execution analysis of the program. The set of indirect function call targets is expanded by identifying similar target functions based on feature embeddings generated by a graph neural network. According to other illustrative embodiments, a computer system and computer program product for indirect function call target identification in software are provided.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
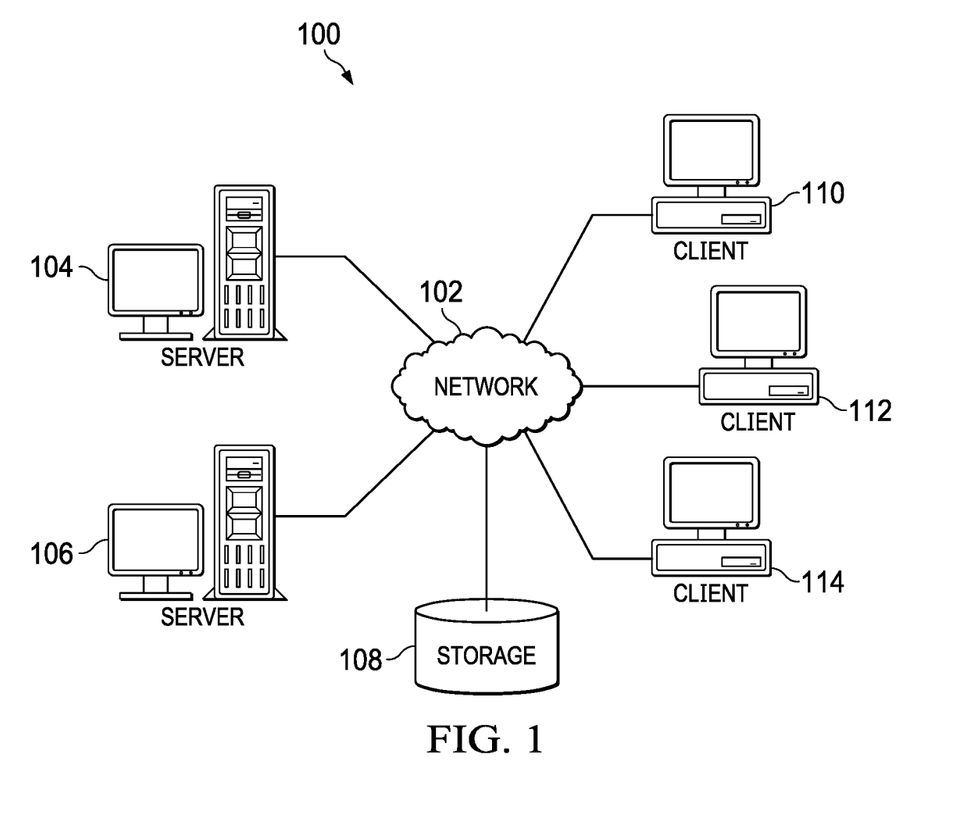
FIG. 1 is a pictorial representation of a network of data processing systems in which illustrative embodiments may be implemented.
Figure 2:
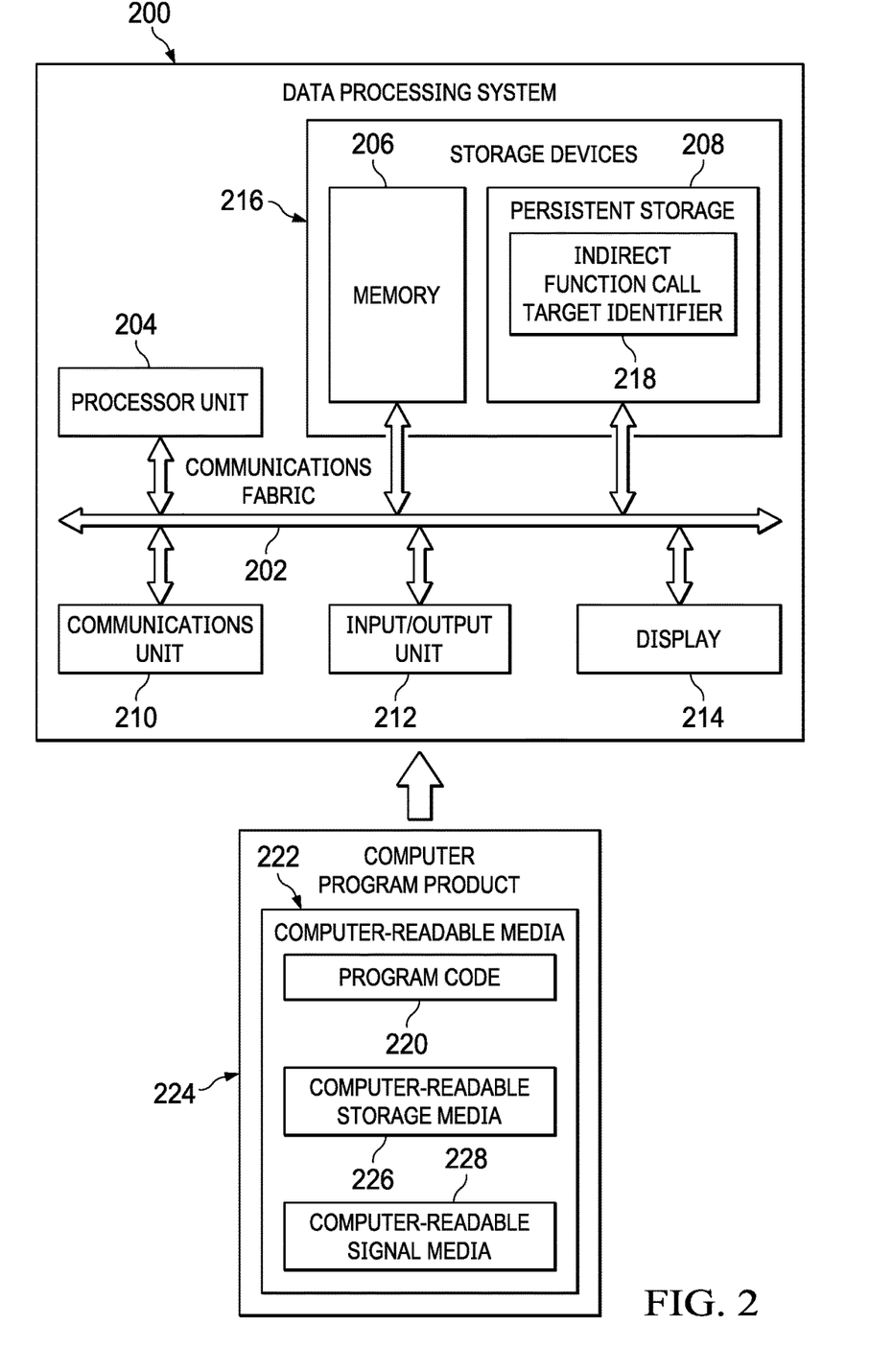
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide indirect function call target identification services to registered client devices. An indirect function call refers to a function invocation in a program via a function pointer. Dereferencing the function pointer at runtime yields the referenced target function. The referenced target function is called indirectly through a variable rather than through a fixed address as in a regular (i.e., direct) function call. Server 104 and server 106 provide the indirect function call target identification services by first generating function call graphs of programs based on static analysis of the programs' source codes by a compiler or other program analysis tool. The programs may be, for example, operating system-level software comprised of multiple modules. Server 104 and server 106 also generate feature embeddings corresponding to features of functions of the programs using graph neural networks trained on the function call graphs and function features. It should be noted that the different functions may be performed by different modules of the programs.

In addition, server 104 and server 106 utilize a clustering algorithm to cluster functions that have similar features together based on the generated feature embeddings to form clusters of similar functions. Further, server 104 and server 106 perform an explicit data dependency analysis on the function call graphs to identify data dependencies between software modules of the programs with regard to indirect function call targets and perform a dynamic execution analysis of the programs to identify indirect function call targets. Furthermore, server 104 and server 106 generate ground-truth datasets of indirect function call targets based on the explicit data dependency and dynamic execution analyses. Moreover, server 104 and server 106 expand the ground-truth datasets of indirect function call targets using functions in the clusters of similar functions that have features similar to those functions in the ground-truth datasets of indirect function call targets. Server 104 and server 106 utilize the expanded ground-truth datasets of indirect function call targets to perform at least one of fuzz testing, vulnerability detection, exploitation discovery, or program behavior analysis on the programs.

Ground-truth is information that is known to be real or true, provided by direct observation and measurement (i.e., empirical evidence) as opposed to information provided by inference. As used herein, a ground-truth dataset of indirect function call targets means that indirect function call targets can be precisely identified by the explicit data dependency analysis and the dynamic execution analysis. These identified indirect function call targets in the ground-truth dataset are always correct. The ground-truth indirect function call targets are a subset of the entire indirect function call targets in a program. Most indirect function call targets cannot be identified until late in runtime. As a result, illustrative embodiments utilize the graph neural network to infer potential indirect function call targets based on the ground-truth dataset of indirect function call targets.

Client 110, client 112, and client 114 also connect to network 102. Clients 110, 112, and 114 are registered client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, smart vehicles, and the like, with wire or wireless communication links to network 102. Users of clients 110, 112, and 114 may utilize clients 110, 112, and 114 to request the indirect function call target identification services provided by server 104 and server 106 to be performed on clients 110, 112, and 114.

Storage 108 is a network storage device capable of storing any type of data in a structured format or an unstructured format. In addition, storage 108 may represent a plurality of network storage devices. Further, storage 108 may store identifiers and network addresses for a plurality of registered client devices, identifiers for a plurality of programs (e.g., operating system-level software) corresponding to the plurality of registered client devices, source code corresponding to the plurality of programs, function call graphs corresponding to the plurality of programs, software module data dependency graphs corresponding to the plurality of programs, lists of functions corresponding to the plurality of programs that include features of the functions, and the like. Furthermore, storage 108 may store other types of data, such as authentication or credential data that may include usernames, passwords, and the like associated with, for example, program developers, system administrators, and client device users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the indirect function call target identification processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores indirect function call target identifier 218. However, it should be noted that even though indirect function call target identifier 218 is illustrated as residing in persistent storage 208, in an alternative illustrative embodiment indirect function call target identifier 218 may be a separate component of data processing system 200. For example, indirect function call target identifier 218 may be a hardware component coupled to communication fabric 202 or a combination of hardware and software components. In another alternative illustrative embodiment, a first set of components of indirect function call target identifier 218 may be located in data processing system 200 and a second set of components of indirect function call target identifier 218 may be located in a second data processing system, such as, for example, server 106 in FIG. 1.

Indirect function call target identifier 218 controls the process of indirect function call target identification in software, such as, for example, operating system kernels, operating system-level software, and the like, located on registered client devices. As a result, data processing system 200 operates as a special purpose computer system in which indirect function call target identifier 218 in data processing system 200 enables accurate identification of indirect function call targets for improved fuzz testing, vulnerability detection, and exploitation discovery to increase security of software. In particular, indirect function call target identifier 218 transforms data processing system 200 into a special purpose computer system as compared to currently available general computer systems that do not have indirect function call target identifier 218.

Communications unit 210, in this example, provides for communication with other computers, data processing systems, and client devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Indirect function calls, which are represented as function pointers, are often used in large C/C++ programs, such as, for example, operating system kernels, browsers, or the like, to enable dynamic function selection based on runtime values. An indirect function call uses a call instruction with a target function address, which is only determined at runtime.

Precise identification of indirect function call targets is needed to build accurate control-flow graphs, which are the basis of program analysis. Precise identification of indirect function call targets is especially important for program fuzz testing, program vulnerability detection, program exploitation discovery, program behavior analysis, and the like. However, current compilers cannot precisely identify indirect function call targets statically at compile time because indirect function call target addresses can only be determined by values computed at runtime.

Solutions currently exist that approximate potential target functions of indirect calls. One current solution utilizes point-to analysis to identify indirect function call targets. Point-to analysis is a part of pointer analysis, which is a general approach to matching a function pointer to its corresponding function address. However, because of function pointer aliasing, traditional point-to analysis is not precise, especially when used to analyze large programs. Another current solution utilizes type analysis to identify indirect function call targets. Type analysis is also used in indirect function call targets identification because it can be sound in most cases. In other words, type analysis identifies the indirect function call targets by matching the type information (e.g., features) of potential target functions and the call site instruction. A call site instruction in a program binary can be for a direct function call or an indirect function call. Yet another current solution to identify indirect function call targets is dynamic execution analysis of the program and recording the executed direct and indirect function call targets.

Each of these current solutions attempt to identify indirect function call targets, but all of these current solutions have an issue with accuracy or precision. Results of these current solutions are not precise enough to be used for program analysis of large programs, such as, for example, operating system-level software. For example, even though the dynamic execution analysis does not introduce false-positive results, code coverage rate of dynamic execution analysis is typically low (e.g., 0-20%) for large programs. This can lead to high false-negative function target rates as most indirect function call addresses are not covered in dynamic execution traces and only one function call target can be mapped for each indirect function call address. Conversely, type analysis and point-to analysis are sound, which means type analysis and point-to analysis do not introduce many false-negative function target results, but type analysis due to common function features and point-to analysis due to function pointer aliasing can still generate a lot of false-positive function target results.

Illustrative embodiments decrease the false-positive function call target rates and the false-negative function call target rates generated by current solutions. It should be noted that illustrative embodiments can integrate with the type analysis and point-to analysis approaches to significantly reduce the false-positive function target rates generated by these approaches. Specifically, illustrative embodiments identify indirect function call targets by analyzing the explicit data dependency between the function call-site module and the function address taken module of the program. The function call-site module is where a function call-site instruction is located. The function address taken module is where an address of a called function is located.

Illustrative embodiments utilize the explicit data dependency between the function address taken and the specific function call-site instruction to generate a set of ground-truth indirect function call targets. The set of ground-truth indirect function call targets is a relatively small set of indirect function call targets, which are sure to be called. Furthermore, illustrative embodiments utilize function similarity, which is based on feature embeddings generated by a graph neural network, to expand the ground-truth dataset of indirect function call targets to identify indirect function call targets with more complex data dependencies. A feature embedding is a vector representation of a feature of a function. These complex data dependencies usually involve implicit data flows, which are not found during the explicit data dependency analysis and are missing in a module dependency graph. The module dependency graph shows data dependencies between modules (e.g., the function call-site module and the function address taken module) in the program (e.g., operating system-level software). Data dependency between modules means that data in one module depends on or is needed by data in another module.

The results of current solutions are not accurate enough to be used for static analysis, such as, for example, precise inter-procedural analysis or function call graph building of the program. In contrast, illustrative embodiments achieve both a lower false-negative function call target rate and a lower false-positive function call target rate, by making the final function call target results useful for static analysis. In addition, illustrative embodiments can be used independently or integrated with current solutions to increase the precision of indirect function call target identification.

To increase accuracy of indirect function call target identification, illustrative embodiments utilize explicit data dependency analysis and similar indirect function call target expansion. Illustrative embodiments utilize the explicit data dependency analysis to determine whether any explicit data flow in the program exists that can pass the function address between modules and, therefore, can filter out invalid target functions by providing a function call site that provides a location of a call instruction. An explicit data flow means that the data flow in the program can be modeled and tracked precisely using the explicit data dependency analysis. The function address can only be passed between the modules by sharing global variables or through the function calls. Therefore, given two modules of a program, if one module calls a function or uses a global variable that is defined in another module, then these two modules have a data dependency. Furthermore, if the function calls or global variables can pass the target function addresses, then the call site of an indirect function call target in one module can use the function defined in another module as the target function. Illustrative embodiments use this explicit data dependency analysis to generate an initial set of ground-truth indirect function call targets.

Illustrative embodiments expand the initial set of ground-truth indirect function call targets to include implicit function address passing data flows in the program that are missing in the module dependency graph. Illustrative embodiments utilize function similarity as a metric to rank potential indirect function call targets. Function similarity is based on the observation that target functions mapped to the same indirect function call site usually have similar, such as, for example, function types, data types of local variables, function calls, intra-procedural control flow, and the like. Illustrative embodiments utilize a graph neural network to generate feature embeddings, which represent the features of the functions of the program as vectors. To generate these feature embeddings, illustrative embodiments first build a function call graph of the program that needs to be analyzed.

Moreover, illustrative embodiments utilize the program's function call graph to train the graph neural network. Illustrative embodiments then utilize the trained graph neural network to generate the feature embeddings for all functions of the program. A graph neural network is a deep learning technique that extends existing neural networks for processing data on graphs. Using a graph neural network, nodes in the graph neural network structure add information gathered from neighboring nodes. The last layer of the graph neural network combines all this added information gathered from neighboring nodes into nodes and outputs either a prediction or classification of node features.

During training of the graph neural network, illustrative embodiments can also include other function features, such as the data types of local variables, as node features of each function. Based on the feature embeddings, illustrative embodiments search for similarity between different program functions. Illustrative embodiments can select functions with similarity scores above a defined minimum function similarity threshold value as similar functions. As a result, illustrative embodiments can automatically determine the target functions for any indirect function call. In addition, this identification of indirect function call targets is an iterative process with multiple iterations until closure of similar target functions has been identified.

As a result, illustrative embodiments are capable of generating an accurate function call graph corresponding to a program with precise indirect function call target identification having a decreased false-positive rate that decreases the search space for program security analysis. Illustrative embodiments utilize the accurate function call graph to generate training data for the graph neural network for learning function features and to distinguish between legitimate execution paths in the program and anomalous execution paths. Illustrative embodiments utilize both dynamic execution analysis and explicit data dependency analysis of the program to generate a ground-truth dataset of indirect function call targets. Illustrative embodiments further expand the ground-truth dataset of indirect function call targets to include a set of similar indirect function call targets using the graph neural network trained on the function call graph of the program.

Thus, illustrative embodiments provide one or more technical solutions that overcome a technical problem with the generation of false-positive function call target rates and false-negative function call target rates by current solutions. As a result, these one or more technical solutions provide a technical effect and practical application in the field of program security analysis by accurately identifying indirect function call targets in a program.

Figure 3:
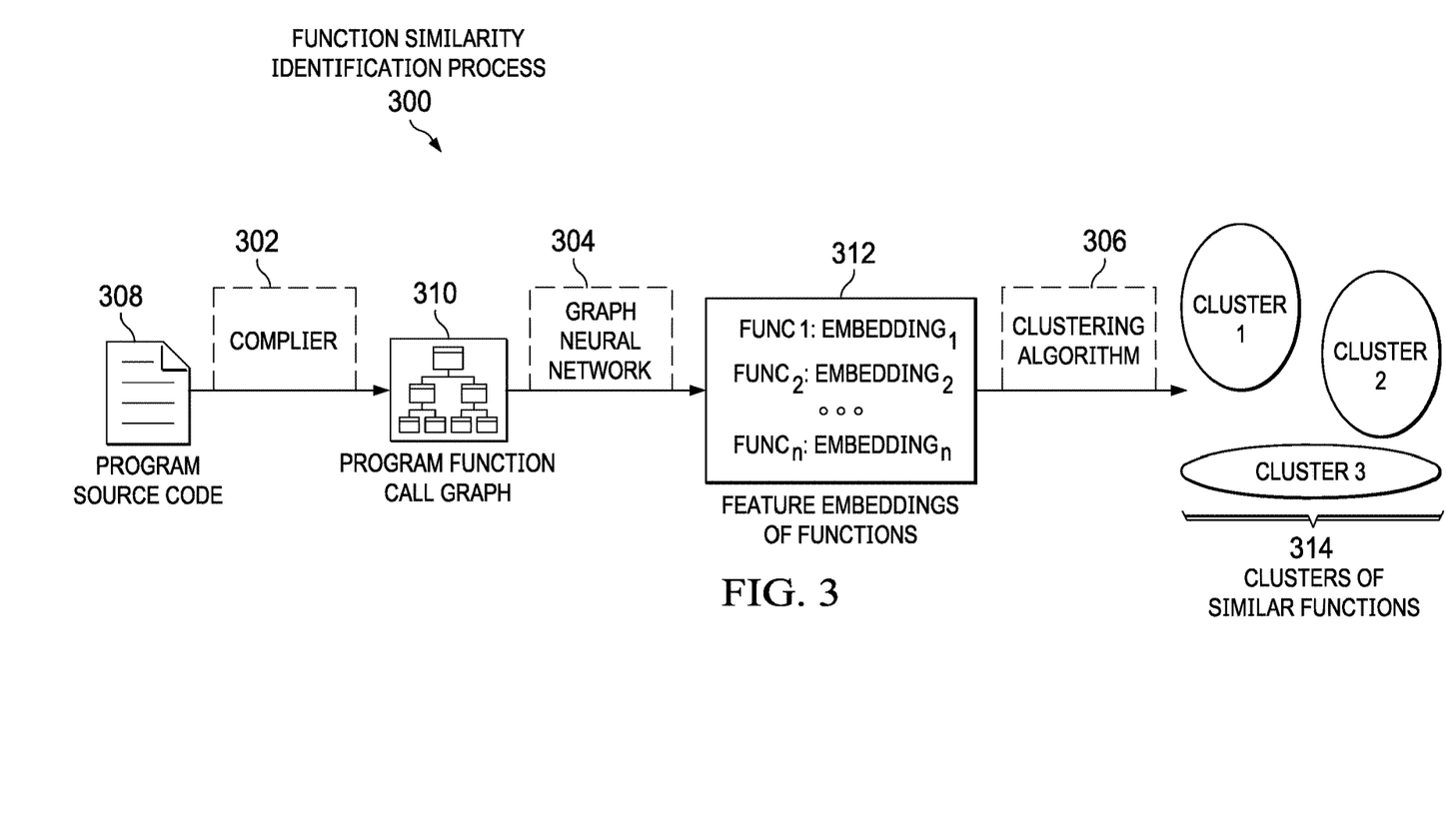
FIG. 3 is a diagram illustrating an example of a function similarity identification process in accordance with an illustrative embodiment.

With reference now to FIG. 3, a diagram illustrating an example of a function similarity identification process is depicted in accordance with an illustrative embodiment. Function similarity identification process 300 may be implemented in a computer, such as server 104 in FIG. 1 or data processing system 200 in FIG. 2.

In this example, function similarity identification process 300 includes compiler 302, graph neural network 304, and clustering algorithm 306. The computer utilizes compiler 302 to perform a static analysis of program source code 308. Program source code 308 represents source code of a particular program, such as, for example, an operating system kernel or operating system-level software, which is to be analyzed for security vulnerabilities.

Based on the static analysis of program source code 308, the compiler generates program function call graph 310. Program function call graph 310 is a graph structure that depicts the functions of the program as nodes and function calls corresponding to the functions as edges between nodes in the graph structure. In addition, each respective node corresponding to a particular function contains a list of features of that particular function.

The computer utilizes the information contained in program function call graph 310 as training data to train graph neural network 304 to identify features of each respective function of the program. Once graph neural network 304 is trained, the computer utilizes graph neural network 304 to generate feature embeddings of functions 312. Feature embeddings of functions 312 include a set of feature embeddings for each respective function of the program. Each feature embedding is a vector representation of a particular feature of a corresponding function.

After graph neural network 304 generates feature embeddings of functions 312, the computer utilizes clustering algorithm 306 to generate clusters of similar functions 314 based on features embeddings of functions 312. Clustering algorithm 306 may be any type of clustering algorithm, such as, for example, a K-means clustering algorithm, a density-based clustering algorithm, a distribution-based clustering algorithm, a centroid-based clustering algorithm, or the like. Clusters of similar functions 314 represent a plurality of different clusters of functions (e.g., cluster 1, cluster 2, and cluster 3), each cluster having similar function features. It should be noted that functions with similar features will be called by the same call-site instruction. When executed, a call-site instruction transfers control to the target function.

Figure 4:
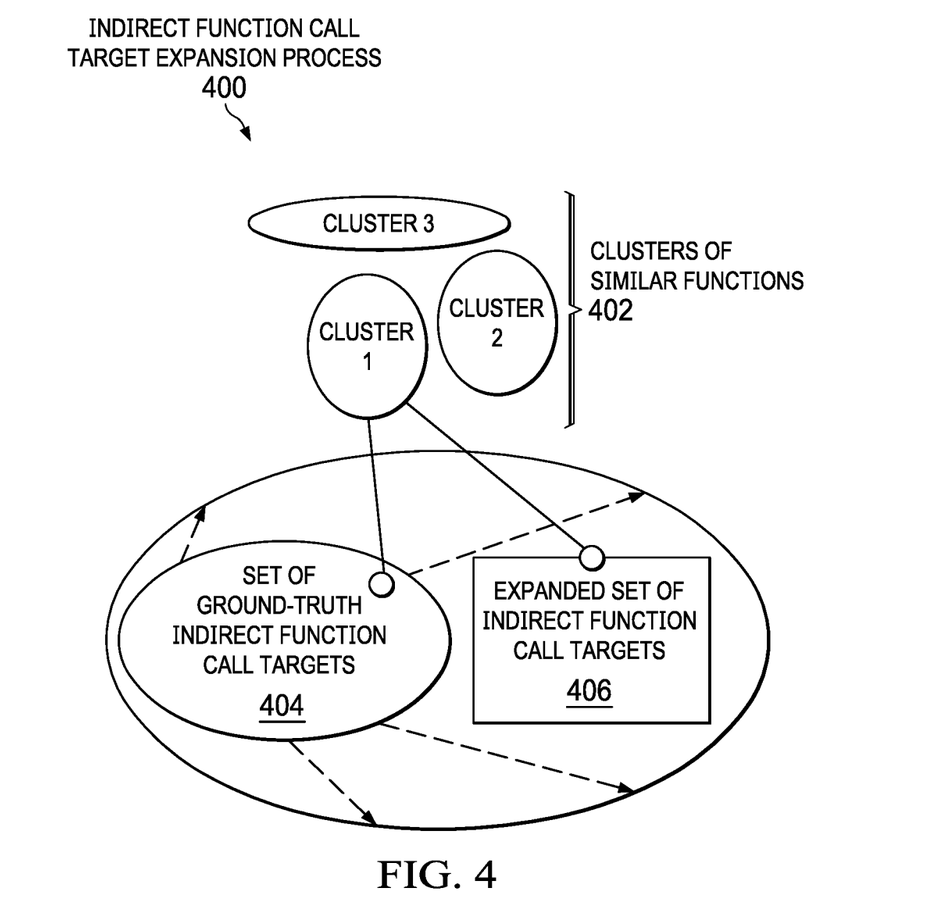
FIG. 4 is a diagram illustrating an example of an indirect function call target expansion process in accordance with an illustrative embodiment.

With reference now to FIG. 4, a diagram illustrating an example of an indirect function call target expansion process is depicted in accordance with an illustrative embodiment. Indirect function call target expansion process 400 may be implemented in a computer, such as server 104 in FIG. 1 or data processing system 200 in FIG. 2.

In this example, indirect function call target expansion process 400 includes clusters of similar functions 402, set of ground-truth indirect function call targets 404, and expanded set of indirect function call targets 406. Clusters of similar functions 402 may be, for example, clusters of similar functions 314 in FIG. 3. The computer generates set of ground-truth indirect function call targets 404 based on the computer performing an explicit data dependency analysis on a function call graph corresponding to the program identifying data dependencies between software modules of the program regarding indirect function call targets and the computer performing a dynamic execution analysis on binary of the program identifying indirect function call target addresses. Set of ground-truth indirect function call targets 404 represents a number of indirect function call targets, each target function in the set is guaranteed to be called by an indirect function call.

The computer searches clusters of similar functions 402 to identify functions that have features similar to the features of set of ground-truth indirect function call targets 404. The computer expands set of ground-truth indirect function call targets 404 with one or more functions identified in the search as having similar features with those of set of ground-truth indirect function call targets 404 because functions with similar features are typically called by the same call-site instruction. By combining set of ground-truth indirect function call targets 404 with the one or more functions having similar features as those of set of ground-truth indirect function call targets 404, the computer generates expanded set of indirect function call targets 406. The computer utilizes expanded set of indirect function call targets 406 to perform, for example, fuzz testing, vulnerability detection, exploitation discovery, program behavior analysis, and the like on the program to identify security vulnerabilities and other security gaps in the program to increase program security.

Figure 5:
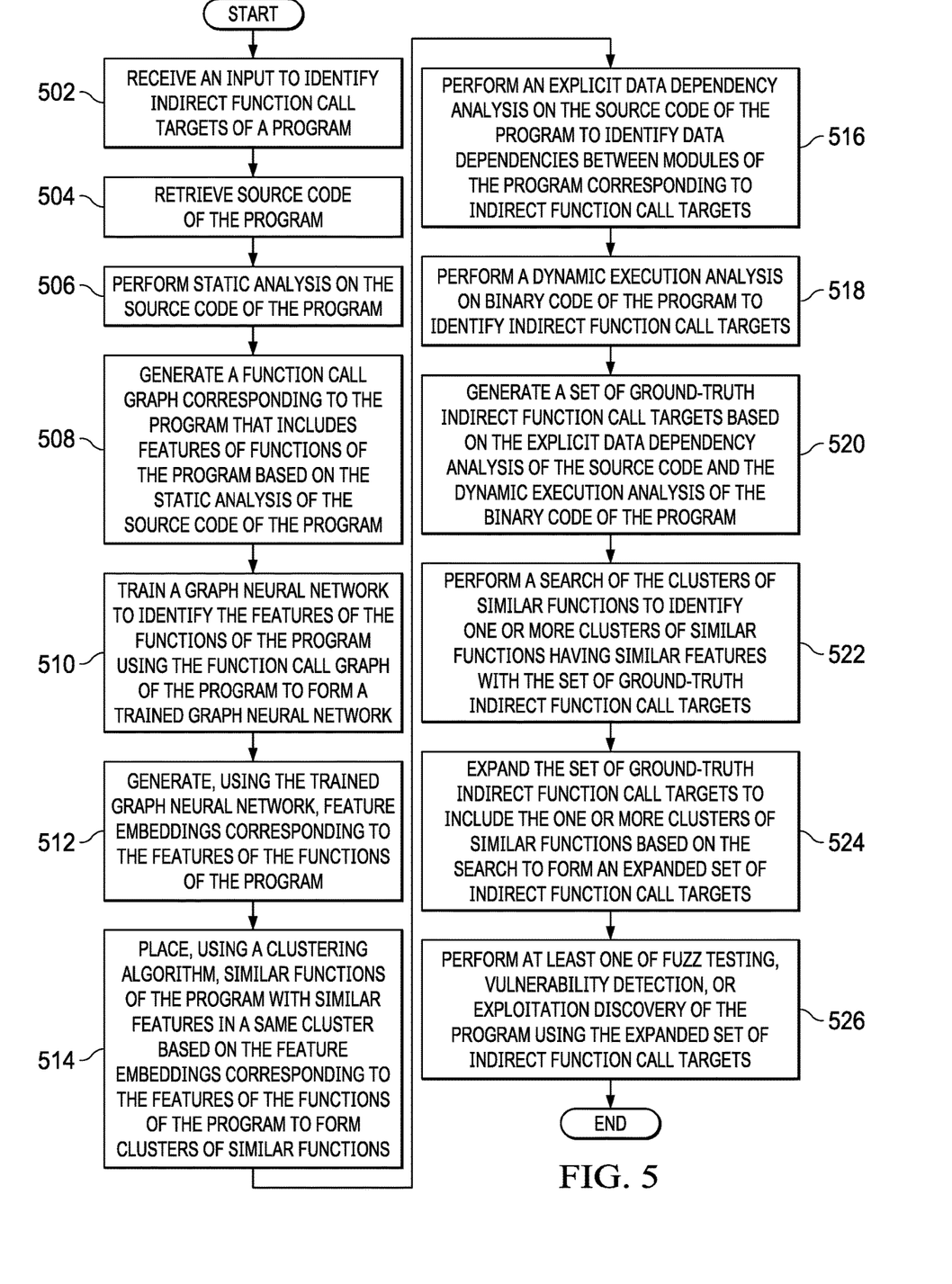
FIG. 5 is a flowchart illustrating a process for identifying indirect function call targets is software in accordance with an illustrative embodiment.

With reference now to FIG. 5, a flowchart illustrating a process for identifying indirect function call targets is software is shown in accordance with an illustrative embodiment. The process shown in FIG. 5 may be implemented in a computer, such as, for example, server 104 in FIG. 1 or data processing system 200 in FIG. 2. For example, the process shown in FIG. 5 may be implemented in indirect function call target identifier 218 in FIG. 2.

The process begins when the computer receives an input to identify indirect function call targets of a program (step 502). The program may be, for example, operating system-level software comprised of a plurality of software modules, such as a function call-site module and a function address taken module. In response to receiving the input, the computer retrieves source code of the program (step 504). The computer may retrieve the source code from a storage device, such as, for example, storage 108 in FIG. 1.

The computer performs a static analysis on the source code of the program (step 506). The computer may utilize, for example, a compiler to perform the static analysis of the source code. Alternatively, the computer may utilize a program analysis tool or the like to perform the static analysis of the source code. The computer utilizes the compiler for explicit data dependency discovery between the software modules of the program. The computer generates a function call graph corresponding to the program that includes features of functions of the program based on the static analysis of the source code of the program (step 508).

The computer trains a graph neural network to identify the features of the functions of the program using the function call graph of the program to form a trained graph neural network (step 510). In other words, the computer trains the graph neural network based on the function call graph and function features to search for similar functions by including similar function call targets. The computer, using the trained graph neural network, generates feature embeddings corresponding to the features of the functions of the program (step 512). The computer generates a set of feature embeddings for each respective function of the program.

The computer, using a clustering algorithm, places similar functions of the program with similar features in a same cluster based on the feature embeddings corresponding to the features of the functions of the program to form clusters of similar functions (step 514). The computer utilizes the clustering algorithm to determine function similarity between functions of the program.

In addition, the computer performs an explicit data dependency analysis on the source code of the program to identify data dependencies between modules of the program corresponding to indirect function call targets (step 516). Further, the computer performs a dynamic execution analysis on binary code of the program to identify indirect function call targets (step 518). The computer generates a set of ground-truth indirect function call targets based on the explicit data dependency analysis of the source code and the dynamic execution analysis of the binary code of the program (step 520). It should be noted that the computer may perform steps 510-514 and steps 516-520 concurrently or substantially at a same time.

Subsequently, the computer performs a search of the clusters of similar functions to identify one or more clusters of similar functions having similar features with the set of ground-truth indirect function call targets (step 522). The computer then expands the set of ground-truth indirect function call targets to include the one or more clusters of similar functions based on the search to form an expanded set of indirect function call targets (step 524). Furthermore, the computer performs at least one of fuzz testing, vulnerability detection, or exploitation discovery of the program using the expanded set of indirect function call targets (step 526). Thereafter, the process terminates.

Figure 6:
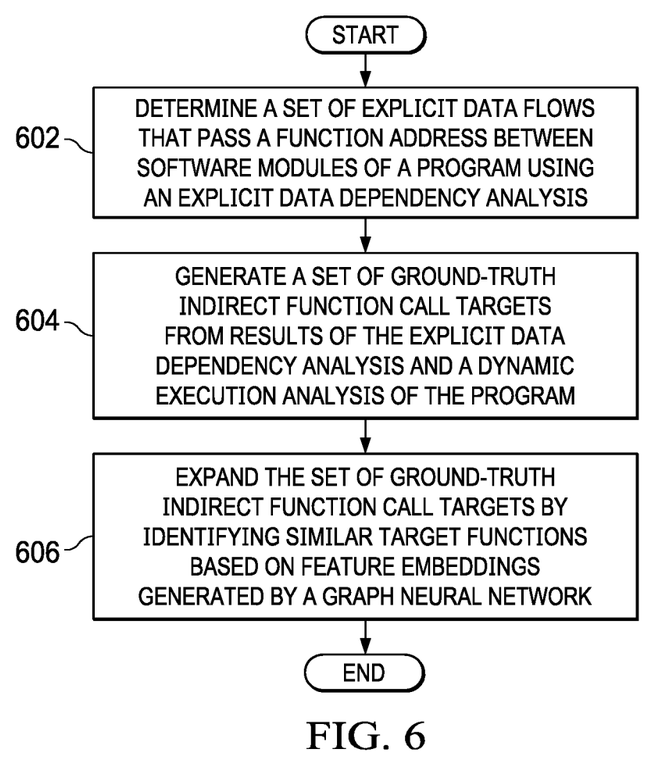
FIG. 6 is a flowchart illustrating a process for expanding a set of ground-truth indirect function call targets in accordance with an illustrative embodiment.

With reference now to FIG. 6, a flowchart illustrating a process for expanding a set of ground-truth indirect function call targets is shown in accordance with an illustrative embodiment. The process shown in FIG. 6 may be implemented in a computer, such as, for example, server 104 in FIG. 1 or data processing system 200 in FIG. 2. For example, the process shown in FIG. 6 may be implemented in indirect function call target identifier 218 in FIG. 2.

The process begins when the computer determines a set of explicit data flows that pass a function address between software modules of a program using an explicit data dependency analysis (step 602). In addition, the computer generates a set of ground-truth indirect function call targets from results of the explicit data dependency analysis and dynamic execution analysis of the program (step 604). Further, the computer expands the set of ground-truth indirect function call targets by identifying similar target functions based on feature embeddings generated by a graph neural network (step 606). Thus, the computer identifies those target functions missed in the explicit data dependency analysis and the dynamic execution analysis due to their complex data flows by using the graph neural network to identify target functions with similar feature embeddings to the functions identified in the ground-truth dataset. Thereafter, the process terminates.

Thus, illustrative embodiments of the present invention provide a computer-implemented method, computer system, and computer program product for identifying indirect function call targets in software. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for indirect function call target identification in software, the method comprising:
   determining a set of explicit data flows that pass a function address between software modules of a program using an explicit data dependency analysis;
   generating a set of indirect function call targets from results of the explicit data dependency analysis and a dynamic execution analysis of the program; and
   expanding the set of indirect function call targets by identifying similar target functions based on feature embeddings generated by a graph neural network.

2. The method of claim 1 further comprising:
   generating a function call graph corresponding to the program that includes features of functions of the program based on static analysis of source code of the program, wherein the function call graph is a graph structure that depicts the functions of the program as nodes and function calls corresponding to the functions as edges between the nodes of the graph structure; and training the graph neural network to identify the features of the functions of the program using the function call graph of the program.

3. The method of claim 2 further comprising:

generating the feature embeddings corresponding to the features of the functions of the program using the trained graph neural network; and placing similar functions of the program with similar features in a same cluster based on the feature embeddings corresponding to the features of the functions of the program.

4. The method of claim 3 further comprising:

using a clustering algorithm to cluster functions of the program that have similar features together based on the generated feature embeddings that correspond to the features of the functions of the program.

5. The method of claim 3, wherein a set of feature embeddings is generated for each respective function of the program.

6. The method of claim 1 further comprising:

performing the explicit data dependency analysis on source code of the program to identify data dependencies between modules of the program corresponding to indirect function call targets;

performing the dynamic execution analysis on binary of the program to identify indirect function call targets; and generating a set of ground-truth indirect function call targets based on the explicit data dependency analysis of the source code and the dynamic execution analysis of the binary of the program.

7. The method of claim 6 further comprising:

performing a search of clusters of similar functions to identify one or more clusters of similar functions having similar features with the set of ground-truth indirect function call targets; and expanding the set of ground-truth indirect function call targets to include the one or more clusters of similar functions based on the search to form an expanded set of indirect function call targets.

8. The method of claim 7 further comprising:

performing at least one of fuzz testing, vulnerability detection, or exploitation discovery of the program using the expanded set of indirect function call targets.

9. The method of claim 1, wherein one of a compiler or a program analysis tool is used for the explicit data dependency analysis; and the graph neural network that is trained based on a function call graph of the program and function features is used to search for similar functions.

10. A computer system for indirect function call target identification in software, the computer system comprising:

a bus system;

a storage device connected to the bus system, wherein the storage device stores program instructions; and a processor connected to the bus system, wherein the processor executes the program instructions to:

determine a set of explicit data flows that pass a function address between software modules of a program using an explicit data dependency analysis;

generate a set of indirect function call targets from results of the explicit data dependency analysis and a dynamic execution analysis of the program; and expand the set of indirect function call targets by identifying similar target functions based on feature embeddings generated by a graph neural network.

11. The computer system of claim 10, wherein the processor further executes the program instructions to:

generate a function call graph corresponding to the program that includes features of functions of the program based on static analysis of source code of the program, wherein the function call graph is a graph structure that depicts the functions of the program as nodes and function calls corresponding to the functions as edges between the nodes of the graph structure; and train the graph neural network to identify the features of the functions of the program using the function call graph of the program.

12. The computer system of claim 11, wherein the processor further executes the program instructions to:

generate the feature embeddings corresponding to the features of the functions of the program using the trained graph neural network; and place similar functions of the program with similar features in a same cluster based on the feature embeddings corresponding to the features of the functions of the program.

13. The computer system of claim 10, wherein the processor further executes the program instructions to:

perform the explicit data dependency analysis on source code of the program to identify data dependencies between modules of the program corresponding to indirect function call targets;

perform the dynamic execution analysis on binary of the program to identify indirect function call targets; and generate a set of ground-truth indirect function call targets based on the explicit data dependency analysis of the source code and the dynamic execution analysis of the binary of the program.

14. The computer system of claim 13, wherein the processor further executes the program instructions to:

perform a search of clusters of similar functions to identify one or more clusters of similar functions having similar features with the set of ground-truth indirect function call targets; and expand the set of ground-truth indirect function call targets to include the one or more clusters of similar functions based on the search to form an expanded set of indirect function call targets.

15. A computer program product for indirect function call target identification in software, the computer program product comprising a computer-readable storage medium having program instructions embodied therewith, the program instructions executable by a computer to cause the computer to perform a method of:

determining a set of explicit data flows that pass a function address between software modules of a program using an explicit data dependency analysis;

generating a set of indirect function call targets from results of the explicit data dependency analysis and a dynamic execution analysis of the program; and expanding the set of indirect function call targets by identifying similar target functions based on feature embeddings generated by a graph neural network.

16. The computer program product of claim 15 further comprising:

generating a function call graph corresponding to the program that includes features of functions of the program based on static analysis of source code of the program, wherein the function call graph is a graph structure that depicts the functions of the program as nodes and function calls corresponding to the functions as edges between the nodes of the graph structure; and training the graph neural network to identify the features of the functions of the program using the function call graph of the program.

17. The computer program product of claim 16 further comprising:
generating the feature embeddings corresponding to the features of the functions of the program using the trained graph neural network; and
placing similar functions of the program with similar features in a same cluster based on the feature embeddings corresponding to the features of the functions of the program.

18. The computer program product of claim 15 further comprising:
performing the explicit data dependency analysis on source code of the program to identify data dependencies between modules of the program corresponding to indirect function call targets;
performing the dynamic execution analysis on binary of the program to identify indirect function call targets; and
generating a set of ground-truth indirect function call targets based on the explicit data dependency analysis of the source code and the dynamic execution analysis of the binary of the program.

19. The computer program product of claim 18 further comprising:
performing a search of clusters of similar functions to identify one or more clusters of similar functions having similar features with the set of ground-truth indirect function call targets; and
expanding the set of ground-truth indirect function call targets to include the one or more clusters of similar functions based on the search to form an expanded set of indirect function call targets.

20. The computer program product of claim 19 further comprising:
performing at least one of fuzz testing, vulnerability detection, or exploitation discovery of the program using the expanded set of indirect function call targets.

* * * * *